June 26, 1956     R. W. WOLLENTIN     2,752,313
ERYTHEMAL PHOSPHOR AND METHOD OF MAKING THE SAME
Filed March 31, 1953
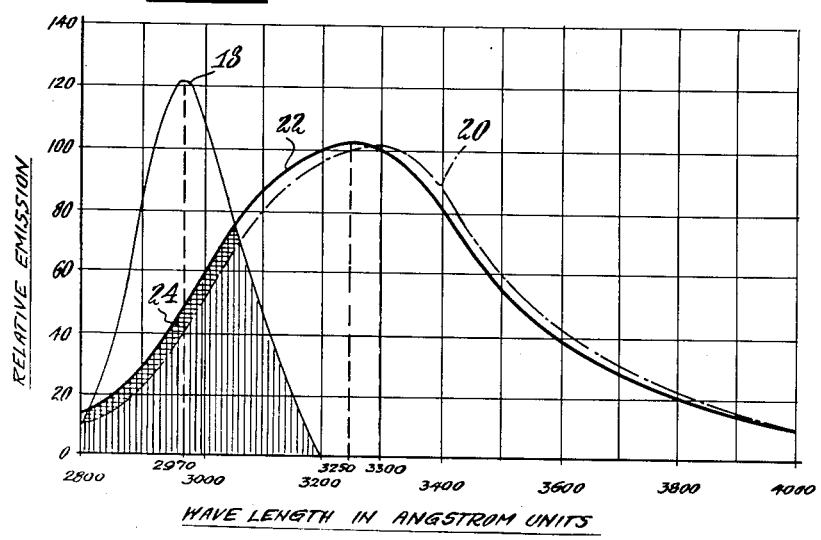
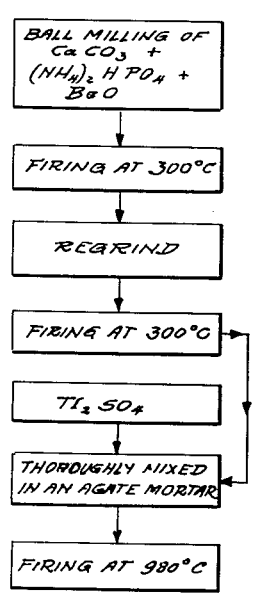
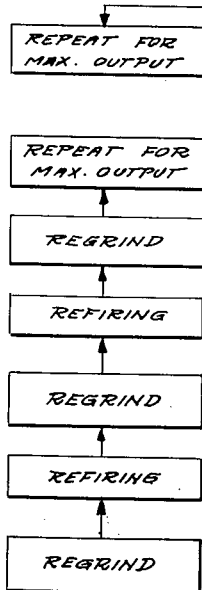
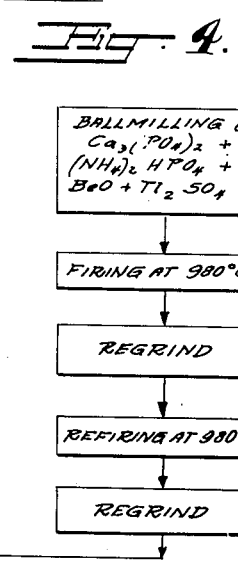
INVENTOR
R. W. WOLLENTIN.
BY
ATTORNEY United States Patent Office 2,752,313
Patented June 26, 1956

2,752,313

ERYTHEMAL PHOSPHOR AND METHOD OF MAKING THE SAME

Robert W. Wollentin, Bloomfield, N. J., assignor to Westinghouse Electric Corporation, East Pittsburgh, Pa., a corporation of Pennsylvania Application March 31, 1953, Serial No. 345,884

3 Claims. (Cl. 252—301.4)

This invention relates to phosphors and methods of making and, more particularly, to an improved phosphor having a large response in the erythemal region of the spectrum with its peak of emission at approximately 3250 A. U., when irradiated with 2537 A. U. ultraviolet.

Heretofore, it has been known that a thallium-activated calcium orthophosphate phosphor, when irradiated with 2537 A. U. ultraviolet has its peak of emission at about 3300 A. U., as disclosed in the Roberts Patent No. 2,447,210. Because a portion of the emission of this phosphor falls within the erythemal region of the spectrum, this phosphor has been used in low pressure mercury discharge devices as a source of suntan radiation. The erythemal range extends from below 2800 A. U. to about 3200 A. U. and it can be thus be seen that if the radiation has a peak of emission at 3300 A. U., a relatively small percentage of the total emission of the thallium-activated calcium phosphate phosphor falls within the erythemal range. It can be further seen that any improvement in this phosphor which shifts the peak of emission toward the shorter wave lengths will increase the efficiency of the phosphor as a suntan phosphor by increasing the percentage of the emission falling within the erythemal effective portion of the spectrum.

It is the general object of my invention to shift the peak of emission of the thallium-activated calcium orthophosphate phosphor toward the erythemal effective portion of the spectrum by the addition of beryllium phosphate or lanthanum phosphate.

It is a further object of my invention to provide allowable ranges of additions of beryllium phosphate or lanthanum phosphate to thallium-activated calcium phosphate phosphor, which additions will increase the percentage of radiation falling within the erythemal effective portion of the spectrum.

Yet another object of my invention is to provide optimum amounts of additions of beryllium phosphate or lanthanum phosphate in order to obtain a peak of emission at 3250 A. U.

A still further object of my invention is to provide methods of preparing the improved thallium-activated calcium phosphate phosphor with additions of beryllium phosphate or lanthanum phosphate.

The aforesaid objects of the invention, and other objects which will become apparent as the description proceeds, are achieved by providing an addition of beryllium phosphate or lanthanum phosphate to the thallium-activated calcium phosphate phosphor, and by providing methods for making the same.

For a better understanding of my invention, reference should be had to the accompanying drawings wherein—

Figure 1 is an elevational view with a part in longitudinal section of a fluorescent lamp embodying my invention;

Fig. 2 is a diagram showing the relationship between the fluorescent response of a phosphor embodying my invention, the phosphor previously used for the purpose, and the erythemal spectrum, the ordinates of the erythemal curve showing relative erythemal effectiveness over the range of wavelengths covered;

Fig. 3 is a flow diagram illustrating one embodiment of my method;

Fig. 4 is a flow diagram illustrating another embodiment of my method.

Although the principles of the invention are broadly applicable to phosphors, and particularly to phosphors used in conjunction with suntan radiation generating means, the invention is usually employed in conjunction with a low pressure mercury discharge device and hence it has been so illustrated and will be so described.

With specific reference to the drawings, there is shown in Fig. 1 a 40 watt fluorescent lamp 10 with suitable electrodes 12 located at the ends of the sealed envelope 14 made of a lime glass, such as Corning Code No. 9821, for example. This type glass transmits the erythemal radiations of wavelengths longer than 2600 A. U. but is impermeable to radiations of shorter wavelengths. During operation of the lamp 10 there is sustained between the electrodes 12 a low pressure positive-column discharge through the usual fluorescent lamp filling of argon and mercury vapor, which generates an abundance of short wavelength radiations, including 2537 A. U. The internal surface of the envelope is provided with a coating 16 of my novel phosphor as herein disclosed, which when excited by the generated radiations, emits a large amount of radiations in the erythemal range between below 2800 and 3200 A. U. Such a lamp as is shown in Fig. 1 will produce only a very small proportion of visible radiation.

In Fig. 2 the curve 18 roughly represents the erythemal spectrum which, as heretofore noted, extends from below 2800 A. U. to about 3200 A. U. The curve 20, shown in dotted lines, represents the emission spectrum of the phosphor disclosed in the heretofore noted Roberts patent which has a peak of emission at about 3300 A. U. The curve 22, shown in solid lines, represents the emission spectrum for my new and improved thallium-activated calcium orthophosphate phosphor with an addition of optimum amounts of beryllium phosphate or lanthanum phosphor. These optimum amounts will be hereinafter explained. As illustrated, this new and improved phosphor has a peak of emission at about 3250 A. U. The increased erythemal efficiency of my new and improved phosphor is represented by the cross-hatched area 24 which shows the increase in radiation obtained in the erythemal range by the addition of the optimum amounts of beryllium phosphate or lanthanum phosphate to the thallium-activated calcium phosphate phosphor. The use of other than the optimum amounts of lanthanum phosphate or beryllium phosphate, as are hereinafter defined, will shift the peak of emission to the right from the 3250 A. U. peak of emission, as shown, or toward the longer wavelengths. However, as long as the allowable amounts of beryllium phosphate or lanthanum phosphate, as hereinafter defined, are used as additions, the peak of emission for my new and improved erythemal phosphor will fall to the left of the peak of emission for the thallium-activated calcium phosphate phosphor, as illustrated in curve 20 of Fig. 2, and the radiation falling within the erythemal range will be greater. This, of course, results in improved erythemal radiation efficiency.

Beryllium phosphate may be added to the thallium-activated calcium phosphate phosphor in amounts varying from 0.05 to 4.8% by weight in order to increase the erythemal radiation of the thallium-activated calcium phosphate phosphor. The optimum amount, however, consists of an addition of beryllium phosphate of about 1% by weight, and with such an addition a maximum gain of about 9% in the erythemal output of the thallium-activated calcium phosphate phosphor is obtained. Lanthanum phosphate may be added in amounts varying from 0.05 to 6% by weight, and the maximum erythemal radiation gain is obtained with the addition of about 2.0% by weight of lanthanum phosphate.

In the preparation of the phosphor there is produced a solid solution of thallium-activated calcium phosphate and beryllium phosphate or lanthanum phosphate. It is not necessary to introduce the beryllium or lanthanum as phosphates. Any compound may be used that will ultimately yield phosphates in the finished phosphor, such as the oxides, carbonates, hydroxides, nitrates, etc. Calcium may be supplied by the oxide, carbonate, nitrate, sulphate, or any other compound that will react with a source of phosphate radical to form tertiary calcium phosphate, or the calcium may be supplied directly as the tertiary phosphate. The amount of thallium to be used is dependent upon the time and temperature of firing in the formation of the phosphor because of the volatility of this metal. A dry mix method (as is well known in the art) and a firing temperature of 1000° C. for 90 minutes requires 4.3% of thallium by weight in the raw materials.

In preparing my improved phosphor, the batch ingredients employed should be of the high purity normally used in the preparation of phosphors, and preferably should be at least C. P. grade. This is particularly important where it is desired to increase the erythemal output.

The following examples are given to illustrate the methods of producing my improved phosphor as described in this invention:

*Example I*

| Material: | Moles |
| --- | --- |
| $CaCO_3$ | 3.000 |
| $(NH_4)_2HPO_4$ | 2.150 |
| $BeO$ | 0.0428 |
| $Tl_2SO_4$ | 0.0326 |

In producing the phosphor from the above formula, the first three ingredients are finely ground and thoroughly mixed for about two hours, desirably by ball-milling and then fired at 300° C. for about two to four hours. It is best to regrind the heated mass before heating for a second time at 300° C. The thallous sulphate is desirably added to the finely powdered calcium orthophosphate so produced and thoroughly mixed. The firing temperature is then desirably raised to 980° C. and the sample heated for one-half hour. The phosphor is then preferably reground, and refired for about one-half hour. The process of regrinding, refiring and regrinding is desirably repeated at least two times, or until the highest output is obtained. Firing at the higher temperatures is necessarily carried out in covered refractory crucibles, and covered silica crucibles have been found satisfactory. This procedure is represented by the flow diagram of Fig. 3. During the firing a part of the thallium is removed by vaporization. Enough thallium remains, however, as only a very small portion is needed for activation, as in connection with the formation of thallium-activated calcium orthophosphate, disclosed in the heretofore noted patent to Roberts. The resultant phosphor has a peak of emission at about 3250 A. U. When following the foregoing procedure, it is desirable to use, in the unfired batch, an excess of 5–10% of phosphate to obtain maximum efficiency.

*Example II*

| Material: | Moles |
| --- | --- |
| $CaHPO_4$ | 2.000 |
| $CaCO_3$ | 1.000 |
| $(NH_4)_2HPO_4$ | 0.100 |
| $Be_3(PO_4)_2$ | 0.0143 |
| $Tl_3PO_4$ | 0.0217 |

The same method of firing as in Example I is used. The resultant phosphor is the same as obtained in Example I.

*Example III*

| Materials: | Moles |
| --- | --- |
| $Ca_3(PO_4)_2$ | 1.000 |
| $(NH_4)_2HPO_4$ | .150 |
| $BeO$ | .0428 |
| $Tl_2SO_4$ | .0326 |

The raw materials are thoroughly mixed by grinding, preferably ball-milling, and are fired in covered silica trays for one to four hours at 800° C. to 1050° C., a convenient heat treatment being two hours at 980° C. After cooling, the mass is then desirably reground, refired at 980° C. for one-half hour, and reground, this process being desirably repeated at least two times or until the highest output is obtained. The resultant phosphor is the same as obtained in Example I. When following the foregoing procedure, it is desirable to use, in the unfired batch, an excess of 5–10% of phosphate to obtain maximum efficiency. This procedure is represented by the flow diagram in Fig. 4.

*Example IV*

| Materials: | Moles |
| --- | --- |
| $Ca_3(PO_4)_2$ | 1.000 |
| $(NH_4)_2HPO_4$ | 0.179 |
| $BeO$ | 0.0286 |
| $Tl_2SO_4$ | 0.0217 |

The same method of firing as in Example III is used. The resultant phosphor has an emission peaked at between 3250 A. U. and 3300 A. U.

*Example V*

Use the same procedure as in Example I, but replace the BeO by 0.0133 mole $La_2(SO_4)_3$ and reduce the di-ammonium phosphate to 2.148 moles. The resultant phosphor has an emission peaked at about 3250 A. U.

*Example VI*

| Materials: | Moles |
| --- | --- |
| $CaHPO_4$ | 2.000 |
| $CaCO_3$ | 1.000 |
| $(NH_4)_2HPO_4$ | 0.1591 |
| $La(OH)_3$ | 0.0265 |
| $Tl_2SO_4$ | 0.0326 |

The first four ingredients are ball-milled and fired at 300° C. as in the procedure outlined as under Example I. The rest of the procedure as outlined under Example I is also followed and the resultant phosphor is the same as is obtained in Example V.

*Example VII*

The same proportions and procedure as in Example III are used, except 0.0265 mole of $La_2(SO_4)_3$ replaces the BeO and the di-ammonium phosphate is reduced to 0.148 mole. The resultant phosphor is the same as Examples V and VI.

*Example VIII*

The same proportions and procedure are used as presented in Example IV, except that 0.0199 mole of $La_2(SO_4)_3$ replaces BeO and the di-ammonium phosphate is reduced to 0.162. The resultant phosphor has a peak of emission between 3250 A. U. and 3300 A. U.

It will be recognized that the objects of the invention have been achieved by providing an addition of beryllium phosphate or lanthanum phosphate to thallium-activated calcium phosphate, and by providing methods of preparing my new and improved phosphor.

While one best known embodiment of my invention has been illustrated and described in detail, it is to be particularly understood that the invention is not limited thereto or thereby.

I claim:

1. A phosphor having a high output in the erythemal region and only a very small output of visible radiations, consisting essentially of a thallium-activated phosphate of calcium with from 0.05 to 6% by weight of lanthanum phosphate in solid solution and having its peak of emission at between about 3250 and 3300 A. U.

2. A phosphor having a high output in the erythemal region and only a very small output of visible radiations, consisting essentially of thallium-activated phosphate of calcium with 2% of lanthanum phosphate in the solid solution and having its peak of emission at about 3250 A. U.

3. The method of making a phosphor with a high output in the erythmal region and only a very small output of visible radiations, comprising ball-milling together 3.000 moles of calcium carbonate, 2.148 moles of diammonium acid phosphate, and 0.0133 mole of lanthanum sulphate for about two hours, firing at 300° C. for about two hours, regrinding, firing, heating a second time at 300° C., adding .0326 mole of tertiary thallium phosphate, thoroughly mixing, raising the firing temperature to 980° C. for one-half hour, regrinding, refiring, regrinding, and continuing until the maximum output is obtained.

References Cited in the file of this patent

UNITED STATES PATENTS

| | | |
|---|---|---|
| 2,447,210 | Roberts | Aug. 17, 1948 |
| 2,563,900 | Wollentin | Aug. 14, 1951 |
| 2,563,910 | Nagy | Aug. 14, 1951 |